US005871848A

United States Patent [19]

Bozack et al.

[11] Patent Number: 5,871,848

[45] Date of Patent: Feb. 16, 1999

[54] ENHANCED-WETTING, BORON-BASED LIQUID-METAL ION SOURCE AND METHOD

[75] Inventors: Michael J. Bozack, Opelika, Ala.; Lynwood W. Swanson, Portland, Oreg.; Anthony E. Bell, McMinnville, Oreg.; William M. Clark Jr., Thousand Oaks; Mark W. Utlaut, Saugus, both of Calif.; Edmund K. Storms, Los Alamos, N. Mex.

[73] Assignee: Oregon Graduate Institute of Science & Technology, Portland, Oreg.

[21] Appl. No.: 944,364

[22] Filed: Oct. 6, 1997

Related U.S. Application Data

[63] Continuation-in-part of Ser. No. 706,357, Aug. 30, 1996, abandoned, which is a continuation of Ser. No. 53,325, May 22, 1987, abandoned, and a continuation-in-part of Ser. No. 692,881, Jul. 31, 1996, abandoned, which is a continuation of Ser. No. 87,932, Aug. 21, 1987, abandoned.

[51] Int. Cl.[6] .......... B32B 9/00

[52] U.S. Cl. .......... 428/408; 427/77; 427/113; 427/376.6; 427/399; 204/298; 313/312.1; 315/111.81

[58] Field of Search .......... 427/113, 77, 399, 427/376.6; 204/298; 313/362.1; 315/111.81; 428/408; 420/463, 466, 441; 148/426, 430

[56] References Cited

U.S. PATENT DOCUMENTS 2,900,281 8/1959 Grams .......... 427/77
4,358,506 11/1982 Intrater .......... 428/408
4,624,833 11/1986 Umemurg .......... 313/362.1

OTHER PUBLICATIONS

Buddery et al., "Borides and Silicides of the Platinum Metals" Nature, Mar. 3, 1951, vol. 167, p. 362.
Hansen, Constitution of Binary Alloys, 1958, Mc Graw–Hill Bool Co. pp. 256–257.
Jap J. Appl. Phys. 21 277, Apr. 17, 1982 Ishitani.
Journel De Physique, 47 pp. 95–100 Bozack Mar.–1986.
Storm, Decleration –Feb. 9, 1988.
M. J. Bozack et al., "Wettability of Transition Metal Boride Eutectic Alloys to Graphite," J. Mat. Sci. *22*, 2421–2430 (1987).
M. J. Bozack et al., "Materials Considerations In Liquid Metal Ion Source Development," J. de Phys. 47, C2 95–100 (Mar. 1986).
Tohru Ishitani et al., "Carbon Needle Emitter For Boron And Aluminum Ion Liquid–Metal–Ion Sources," Jpn. J. Appl. Phys. 21, 277–278 (1982).

*Primary Examiner*—John Sheehan
*Attorney, Agent, or Firm*—Kolisch, Hartwell, Dickinson, McCormack & Heuser

[57] ABSTRACT

A binary, boron-based alloy as a source for field-emission-type, ion-beam generating devices, wherein boron predominates in the alloy, preferably with a presence of about 60 atomic percent. The other constituent in the alloy is selected from the group of elements consisting of nickel, palladium and platinum. Predominance of boron in these alloys, during operation, promotes combining of boron with trace impurities of carbon in the alloys to form $B_4C$ and thus to promote wetting of an associated carbon support substrate.

18 Claims, 1 Drawing Sheet

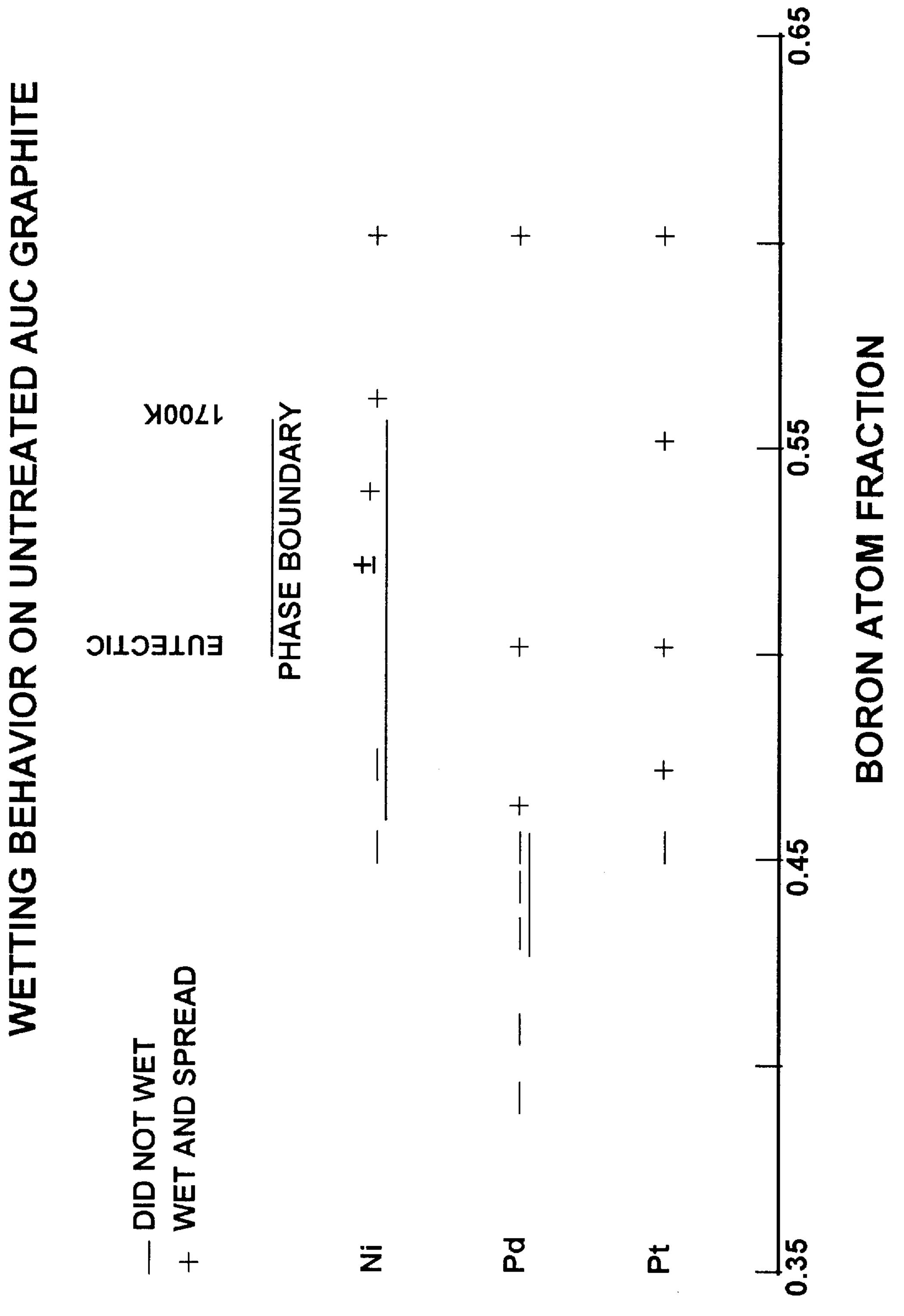
*Figure*

ENHANCED-WETTING, BORON-BASED LIQUID-METAL ION SOURCE AND METHOD

This is a continuation-in-part of application Ser. No. 08/706,357, filed Aug. 30, 1996, now abandoned, which is a continuation of application Ser. No. 07/053,325, filed May 22, 1987, now abandoned. This is also a continuation-in-part of application Ser. No. 08/692,881, filed Jul. 31, 1996, now abandoned, which is a continuation of application Ser. No. 07/087,932, filed Aug. 21, 1987, now abandoned. Each of the above applications are hereby expressly incorporated by reference.

This invention is the result of a contract with the Department of Energy (Contract No. W-7405-ENG-36).

BACKGROUND OF THE INVENTION

This invention generally relates to liquid-metal ion sources for use in field emission-type ion beam generating devices, and more particularly, to a high-wetting-capability, liquid-metal ion source for use in field-emission-type, ion-beam generating devices employing carbon (graphite) substrates, and to a substrate wetting method employing the source. Still more particularly, it relates to such a source which takes the form of a binary alloy including a predominance of boron, which alloy employs a sufficient enrichment of boron to promote significant substrate wetting. Still more particularly, it relates to a method for wetting a graphite substrate with a boron alloy for use in generating an ion beam containing boron.

In the recent past, there has been an extensive and increasing interest in the employment of so-called focused ion beams. Such beams are used for various purposes, such as for micromachining of certain materials, and for implantation of ions in the making of semiconductor devices. In the fabrication of semiconductor devices, circuit elements may be formed by photolithographic techniques or by ion implantation. Field emission sources have been developed for ion implantation wherein a liquid metal adheres to a needle point. The extraction voltage applied between the needle and an extraction electrode shapes the liquid at the needle tip into a cusp, or Taylor cone, with an effective emission point with a size less than 50 Å. The liquid-metal ion source must wet and substantially cover the needle surface in order to provide a stable ion source with an acceptable life. One of many elements which offers an important source of ions for such purposes is boron. However, implementing a successful focused beam of boron ions has presented a number of problems.

Boron is a desirable dopant for use in ion implantation. However, elemental boron is not suitable because of its high melting point. Boron alloys of nickel (Ni), palladium (Pd), and platinum (Pt) have been formed but these alloys tend to corrode needle substrate materials which the alloys readily wet and do not readily wet materials, such as graphite, which the alloys do not corrode.

Boron-based ion sources are extremely corrosive to conventional, metallic, point-source support substrates which are employed in ion-beam generating devices. As a consequence, they yield an operational situation in which practical substrate lifetime expectancy is extremely short—like just a few hours. Carbon, typically in the form of graphite, offers a "material" solution to the corrosion problem when it is employed as such a support substrate, but frustration has existed over the poor ability of known boron-based ion sources to wet such a substrate well enough to function properly as a practical source.

The prior art has made several attempts to solve the wetting problem. In one attempt boron is used to precoat the graphite surface. The boron may be applied to the surface as a boron powder. The boron coating is conventionally heated to a high temperature, about 2500 K, to react the boron with the surface.

Boron in the form of red boron has also been added directly to a eutectic NiB alloy as a flux. The mixture is heated to melting on a graphite surface. This mixture produces some wetting of the graphite surface, but the results are not uniform and predictable, possibly because of the uneven distribution of boron flux.

SUMMARY OF THE INVENTION

A general object of the present invention, in this setting, is to obviate these difficulties and frustrations of the past by offering a unique, enriched boron, boron-based source, and a related method, which can be used successfully with a carbon substrate, with the "wetting difficulty" substantially resolved.

The prior art problems of graphite surface wetting and uniform spreading over the surface are overcome by the present invention and a method is provided for coating a graphite surface with a boron-containing alloy. In accordance with the process herein claimed the boron alloy wets and spreads evenly over the graphite surface. The resulting ion source is stable and has an acceptable operating lifetime.

To achieve the foregoing and other objects, and in accordance with the purposes of the present invention, as embodied and broadly described herein, the apparatus of this invention may comprise a method for wetting a graphite substrate and spreading a boron alloy over the substrate. A noneutectic alloy of boron is formed with a metal selected from the group consisting of nickel, palladium, and platinum with an atomic percentage of boron which is effective to precipitate boron at a wetting temperature which is less than the liquid-phase boundary temperature. The alloy is applied to the substrate and the graphite substrate is then heated to the wetting temperature for a time effective for the alloy to wet and to spread over the substrate.

In another characterization of the present invention, a method is provided for forming an ion-beam emission source with a graphite needle coated with a boron alloy. A noneutectic alloy of boron is formed with a metal selected from the group consisting of nickel, palladium, and platinum with an atomic percentage of boron effective to precipitate boron at a wetting temperature less than the liquid-phase boundary temperature of the alloy. The alloy is applied to the graphite needle surface and the graphite is heated to the wetting temperature for a time effective for the alloy to wet and to spread over the needle surface.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated in and forms a part of the specification, illustrates an embodiment of the present invention and, together with the description, serves to explain the principles of the invention.

The FIGURE illustrates the wetting characteristics of boron alloys according to the present invention, including Ni, Pd, and Pt.

DETAILED DESCRIPTION OF THE INVENTION

Acknowledging the difficulty of employing a boron-based metal ion source, vis-a-vis corrosion of conventional metallic substrates in ion-beam generating devices, the present invention focuses attention on resolving the difficulty of employing such a source with a carbon (graphite) substrate which resists corrosion, but which also resists, in the case of many conventional source materials, the necessary wetting.

The invention, in essence, is founded on the discovery that the non-wetting culprit takes the form of free carbon impurities which exist in the various, usual, boron-based alloys that are employed for liquid-metal ion sources. More particularly, the anti-wetting difficulty appears to spring from the fact that free carbon, the impurity carbon, in conventional alloy materials forms a resistive outer shell over the source material when it is in its plural-phase (liquid/solid) state, which shell tends to cause the source material to remain as a non-spreading, non-wetting bead.

Surprisingly, we have discovered that it is possible, using only a binary alloy, and without resulting to substrate pretreatment techniques, as by boron powder coating, to disable the anti-wetting tendency of free carbon by employing an enriched supply of boron in the alloy to combine with, and thus capture, this carbon in the form of the compound $B_4C$.

It is believed that the excess boron reacts with the graphite to form $B_4C$, which is then readily wet by the alloy. The dispersed boron provided in accordance with the present invention provides a uniform surface of $B_4C$. Sufficient excess B must be provided to react with the surface area to be covered, or wetting will only occur until the excess boron has been reacted. The wetting temperature can be raised or lowered to alter the proximity of the alloy stoichiometry to the saturated limit, or phase boundary.

This discovery has led to the development of three new and very successful ion-source alloys, which are binary in nature, and which combine nickel, palladium and platinum, selectively, with boron. More particularly, in each binary alloy, boron forms a predominant member of the alloy—having at least more than a 50-atomic-percentage presence.

In accordance with the present invention it is found that a boron rich alloy of Ni, Pd, or Pt can be heated to an effective temperature at which the alloy wets a graphite surface and rapidly spreads over the surface. As used herein, the term "liquid-phase boundary" refers to that portion of the phase diagram for the system of interest which separates the all liquid phase from a phase having a liquid alloy phase with boron in excess of the amount which saturates the liquid alloy at a given temperature. By "boron-rich alloy" is meant an alloy with boron in excess of the saturated boron limit of the (liquid+boron) phase at a selected wetting temperature (e.g., $Ni_{0.50}B_{0.50}$ alloy; $Pd_{0.57}B_{0.43}$ alloy).

These alloys can be prepared by arc melting the materials or by heating the materials together in a graphite crucible at a temperature above the liquid phase boundary temperature. Excess boron is then naturally dispersed evenly within the solid phase when the alloy solidifies and the boron is immediately available for surface wetting when the alloy is remelted. This immediate availability of boron is the essential difference between the present invention and the prior art. By "wetting temperature" is meant a temperature below the liquid-phase boundary temperature by an amount effective to obtain a dispersed boron phase in excess of the saturated limit which is available to effectively wet and rapidly spread the alloy over the graphite surface.

While boron concentrations in these alloys as low as about 51% display a significant ability to combine with carbon in the form of $B_4C$, the most preferred forms of the alloys are those in which boron is present with about a 60-atomic-percentage presence.

It has also been noticed that a composition of NiB with insufficient excess boron can be heated in a vacuum in the defined temperature range and wetting and spreading will eventually occur. Ni vaporizes more readily than boron and the liquid alloy will gradually become more rich in boron until a wetting condition occurs.

The Pd—B system behaves like NiB, but a longer time is required with insufficient excess boron since Pd vaporizes at a lower rate than Ni. The Pt—B system also wets like NiB, but a system with insufficient boron will not wet even after being heated, since Pt and boron vaporize at about the same rate.

The Ni—B system has been explored. Pieces of alloy having various compositions of Ni and B were placed on a disc of graphite and heated in a vacuum. Two temperature regimes were used, a low temperature near 1400 K and a high temperature above 1600 K. A summary of the results is set out in the following Table.

The wetting behavior of the Ni—B system is set out in the Table and, with the Pd and Pt systems, in the FIGURE. The phase boundary designation on the FIGURE illustrates the boron atom fraction forming the liquid-phase boundary over a temperature range from the eutectic temperature, i.e., the lowest melting point, to a temperature of 1700 K. Phase boundary information is not available for the Pt system.

TABLE

| COMPOSITION atomic % boron | WET | SPREAD | TEMPERATURE |
|---|---|---|---|
| 20 | no | no | low |
| 30 | no | no | low |
| 30 | yes | no | high |
| 40 | no | no | low |
| 40 | yes | no | high |
| 45 | no | no | low |
| 45 | yes | no | high |
| 50 | yes | no | low |
| 50 | yes | no | high |
| 52 | yes | yes | low |
| 52 | yes | no | high |
| 54 | yes | yes | low |
| 54 | yes | no | high |
| 56 | yes | yes | low |
| 56 | yes | no | high |
| 60 | yes | yes | low |
| 60 | yes | yes | high |

In all cases, however, the ability of the alloys to wet graphite is influenced by the boron content of the alloy. Alloys which contain insufficient boron to have solid boron suspended within the liquid do not wet graphite. If the boron content exceeds the saturation limit of boron at the wetting temperature, the alloy readily wets and flows over the graphite surface. The greater the excess boron, up to a point, the more surface area will be wet.

It should be appreciated that the boron dispersion produced by the present method causes a uniform wetting and spreading of the liquid phase over the surface. No other component or impurity is required to obtain the wetting and spreading behavior of boron compounds according to the present invention. It will also be appreciated that no special purity required for the elements forming the alloys, where impurities no greater than 99% have been used.

Compositions in the Ni—B system between $Ni_{0.44}B_{0.56}$ and $Ni_{0.4}B_{0.6}$ have proven to be satisfactory, while compositions as high as $Ni_{0.25}B_{0.75}$ would be expected to wet and spread. In the case of the Pd—B system, a composition of $Pd_{0.4}B_{0.6}$ has shown excellent spreading characteristics. Compositions as low as $Pd_{0.54}B_{0.46}$ and as high as $Pd_{0.25}B_{0.75}$ are expected to wet and spread. Finally, in the case of the Pt—B system, a composition of $Pt_{0.4}B_{0.6}$ has shown good wetting and spreading. Compositions as low as $Pt_{0.54}B_{0.46}$ and as high as $Pt_{0.25}B_{0.75}$ are expected to wet and spread.

As shown by the FIGURE and the Table, wetting of a graphite surface by a selected boron compound can be obtained by adjusting the process temperature whereby sufficient excess boron is obtained relative to the phase transition stoichiometry that wetting occurs. This would typically require reducing the temperature to move the stoichiometry further from the liquid-phase stoichiometry. At a given temperature, however, an alloy may be formed with sufficient excess boron to wet the surface. As noted above, sufficient excess boron must be included to form $B_4C$ over the surface area which it is desired to wet.

The mechanism which occurs during use of these alloys in a focused ion beam operation, following application of the respective alloys to a graphite substrate, and heating of the applied alloy to a plural-phase (liquid/solid) state, involves the combining of excess boron with the free carbon impurities to capture these impurities in the form of $B_4C$. This creates an alloy condition which promotes spreading of the alloy, and wetting of the substrate, so that the heated source can function well as an ion-beam source.

As was mentioned above, while boron content in excess of 50-atomic-percent offers significant improvement, when the boron content centers at around 60-atomic-percent, the best results seem to be achieved.

While the application of the present invention is discussed in terms of coating an ion emission source, the capability to wet graphite surfaces has other applications. By way of example, the wetting alloys described above can be used as a solder to join pieces of graphite to each other or to a metal. The alloy may be simply placed between two pieces and heated to the wetting temperature to obtain a solder bond. The alloy may be used to provide a coating for the graphite surface in applications tending to oxidize the graphite where the coating is applied as herein discussed.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

It is claimed and desired to secure as Letters Patent:

1. A carbon-capturing method of promoting wetting of a field-emission, ion-beam, carbon substrate by a boron-based, metal ion source which includes trace impurities of carbon, said method comprising applying to such a substrate a binary metal alloy including a predominance of boron, heating the substrate-applied alloy to place it in a heated, plural-phase state, during said heating, and with the alloy in such a state, capturing trace impurities of carbon in the form of $B_4C$ and, by said capturing and $B_4C$ forming, creating a condition in the alloy which enhances its ability to spread and wet the substrate.

2. A carbon-capturing method of promoting wetting of a field-emission, ion-beam, carbon substrate by a boron-based, metal ion source which includes trace impurities of carbon, said method comprising applying to such a substrate a binary metal alloy including a predominance of boron, wherein the alloy takes the form of boron combined with an element selected from the group of elements consisting of nickel, palladium and platinum, and wherein boron makes up about 60-atomic-percent of the alloy, heating the substrate-applied alloy to place it in a heated, plural-phase state, during the heating, and with the alloy in such a state, capturing trace impurities of carbon in the form of $B_4C$ and, by said capturing and $B_4C$ forming, creating a condition in the alloy which enhances its ability to spread and wet the substrate.

3. In combination with a field-emission, ion-beam, carbon-support substrate, a boron(B)-based liquid-metal ion source comprising a binary alloy with the formulation $(X)_a(B)_b$, wherein a equals less than 50-atomic-percent, b equals (100−a)-atomic-percent and X is selected from the group of elements consisting of nickel, palladium and platinum.

4. The combination of claim 3, wherein b equals about 60 atomic percent.

5. A process for coating a graphite needle surface with a boron alloy for use as an ion-beam emission source comprising forming a boron rich binary alloy of boron with another metal selected from the group consisting of nickel palladium and platinum, applying said alloy to said graphite needle, and heating said graphite needle to a temperature to cause said alloy to wet and spread on said graphite needle while said alloy is in a solid/liquid phase.

6. A process for coating a carbon substrate with a boron alloy for use as an ion-beam emission source comprising forming a boron-rich binary alloy of boron with another metal selected from the group consisting of nickel, palladium and platinum, applying said alloy to said carbon substrate, and heating said carbon substrate to a temperature to cause said alloy to wet and spread on said carbon substrate while said alloy is in a liquid/solid phase.

7. A method for wetting a graphite substrate surface and spreading a boron alloy over said substrate, comprising the steps of:

forming a boron rich binary alloy with a metal selected from the group consisting of nickel, palladium and platinum with an atomic percentage of boron in excess of a eutectic composition and effective to precipitate boron in a solid phase at a wetting temperature less than the liquid-phase boundary temperature of said alloy, said excess boron being sufficient to spread and cover an amount of said substrate surface at said wetting temperature;

applying said alloy to said substrate; and heating said graphite substrate to said wetting temperature for a time effective for said alloy to wet and spread over said substrate.

8. A method according to claim 7, wherein said metal is platinum and said atomic percentage of boron is greater than 46%.

9. A method according to claim 7, wherein said metal is nickel and said atomic percentage of boron is at least about 50%.

10. A method according to claim 9, wherein said temperature is at least about 1400°K.

11. A method according to claim 7, wherein said metal is palladium and said atomic percentage of boron is at least about 45%.

12. A method according to claim 11, wherein said temperature is at least about 1500°K.

13. A method for forming an ion-beam emission source with a graphite needle coated with a boron alloy, comprising the steps of:

forming a boron rich binary alloy with a metal selected from the group consisting of nickel, palladium and platinum with an atomic percentage of boron in excess of a eutectic composition and effective to precipitate boron in a solid phase at a wetting temperature less than the liquid-phase transition temperature of said alloy, said excess boron being sufficient to spread and cover an amount of said needle at said wetting temperature;

applying said alloy to said needle; and heating said graphite needle to a temperature above the melting temperature of said alloy and below said transition temperature for a time effective for said alloy to wet and spread over said needle.

14. A method according to claim 13, wherein said metal is platinum and said atomic percentage of boron is greater than 46%.

15. A method according to claim 13, wherein said metal is nickel and said atomic percentage of boron is at least about 50%.

16. A method according to claim 15, wherein said temperature is at least about 1400°K.

17. A method according to claim 13, wherein said metal is palladium and said atomic percentage of boron is at least about 45%.

18. A method according to claim 17, wherein said temperature is at least about 1500°K.

* * * * *